F. L. GORMLEY.
BRAKE MECHANISM FOR LIFTING JACKS AND THE LIKE.
APPLICATION FILED JULY 22, 1920.

1,383,201. Patented June 28, 1921.

Inventor:
Frank L. Gormley,
by Walter E. Lombard.
Atty.

F. L. GORMLEY.
BRAKE MECHANISM FOR LIFTING JACKS AND THE LIKE.
APPLICATION FILED JULY 22, 1920.

1,383,201. Patented June 28, 1921.
2 SHEETS—SHEET 2.

Inventor:
Frank L. Gormley,
by Walter E. Lombard,
Atty.

UNITED STATES PATENT OFFICE.

FRANK L. GORMLEY, OF BROOKLINE, MASSACHUSETTS.

BRAKE MECHANISM FOR LIFTING-JACKS AND THE LIKE.

1,383,201. Specification of Letters Patent. Patented June 28, 1921.

Application filed July 22, 1920. Serial No. 398,116.

*To all whom it may concern:*

Be it known that I, FRANK L. GORMLEY, a citizen of the United States of America, and a resident of Brookline, in the county of Norfolk and Commonwealth of Massachusetts, have invented certain new and useful Improvements in Brake Mechanism for Lifting-Jacks and the like, of which the following is a specification.

This invention relates to brake mechanism and particularly to means for braking lifting jacks or other load-lifting devices, the object of the present invention being to provide a single mechanism which will prevent the load lowering under normal conditions and which when released will place in commission means for retarding the speed of lowering.

The invention consists primarily in a revoluble brake wheel adapted to be rotated in one direction only and this only during the lowering of the load combined with brake arms which are normally in contact with the wheel and preventing its rotation but which may be manually removed from contact with said wheel, said wheel being provided with movable members adapted to move outwardly into contact with said arms when removed and create sufficient friction thereon to retard the rotation of said wheel.

The invention further consists in certain novel features of construction and arrangement of parts which will be understood readily by reference to the description of the drawings and to the claims to be hereinafter given.

For the purpose of illustrating the invention, one preferred form is illustrated in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described except as required by the scope of the appended claims.

Of the drawings.

Similar characters indicate like parts throughout the several figures of the drawings.

Figure 1:
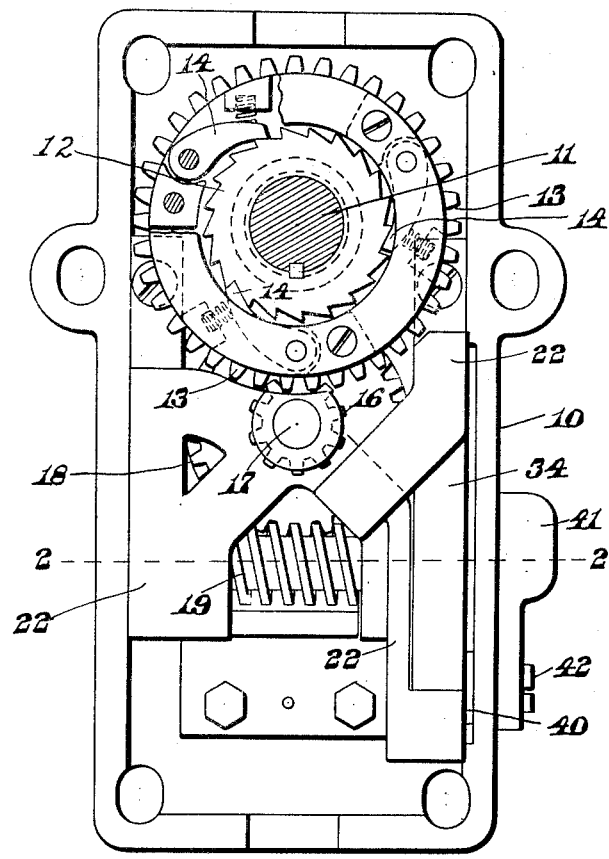
Figure 1 represents an elevation of a cover plate of a lifting jack and showing the mechanism for retarding the speed of the movable member of a self-lowering jack.
Figure 2:
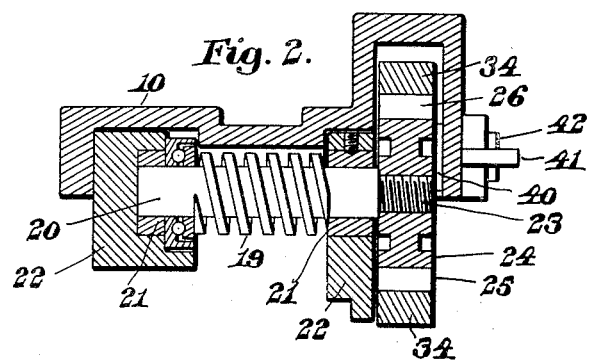
Fig. 2 represents a section of same on line 2, 2, on Fig. 1 and showing the speed retarding devices embodying the principles of the present invention.

In the drawings, 10 is a cover plate adapted to be secured to a lifting jack such as is disclosed in U. S. Letters-Patent No. 1,324,345 issued to me Dec. 9, 1919, to which reference may be made for the general construction of the jack.

Through the plate 10 extends an operating shaft 11 for raising the jack in the manner fully described in the above-entitled patent.

The shaft 11 has secured thereto a ratchet 12 which revolves therewith and said shaft also has loosely mounted thereon a gear 13 carrying spring-pressed pawls 14 which are adapted to be engaged by the teeth of ratchet 12 when the shaft 10 is rotated in a reverse direction during the load lowering operation.

This gear 13 meshes with a pinion 16 on a shaft 17 having mounted thereon and revoluble therewith a worm gear 18 meshing with a worm 19 on a shaft 20 freely revoluble in bearings 21 in brackets 22 secured to the inner face of the cover plate 10.

The shaft 21 has a reduced threaded end 23 on which is mounted a brake wheel 24.

This brake wheel 24 has peripheral depressions 25 therein in each of which is mounted a member 26 one end of which is pivoted at 27 to said wheel 24.

The free end of said member 26 has a transverse cylindrical recess 28 in which is mounted the cylindrical end 29 of a shoe 30, said shoe having a limited movement about the axis of said cylindrical end 29.

The wheel 24 has a plurality of headed members 31 extending through slots in the members 26, the heads of which are positioned in sockets 32 in the outer face of the said members 26 and serve to limit the outward movement of said members.

Figure 3:
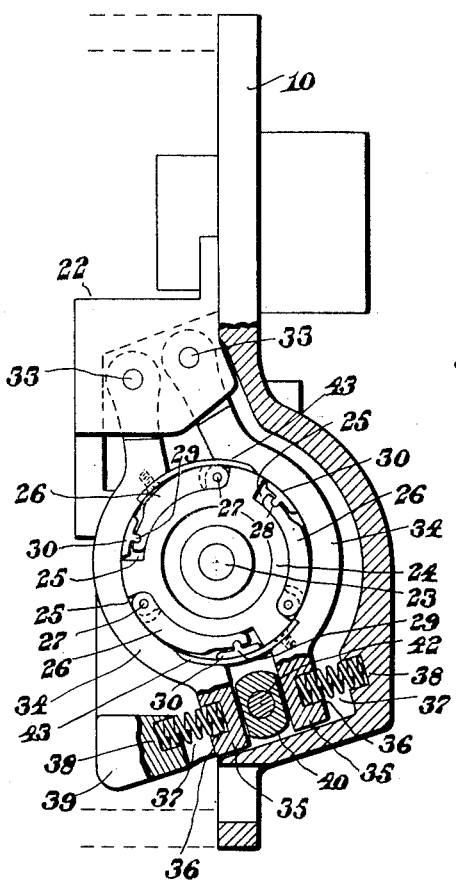
Fig. 3 represents a vertical elevation, partly in section, of the speed retarding devices with the brake arms in position to prevent rotation of the brake wheel.

Normally the outer faces of the members 26 and shoes 30 conform to the periphery of said wheel 24 as shown in Fig. 3 of the drawings.

Pivoted at 33 to the bracket 22, secured to the inner face of the cover plate 10, are two brake arms 34, said brake arms being curved to fit the periphery of said brake wheel 24 and having parallel extensions 35 at their free ends.

Each of the extensions 35 has a socket 36 in its outer face in which rests one end of a spring 37 the opposite end of which rests in a socket 38 in the cover plate 10 of a bracket 39 secured thereto.

This spring 37 normally retains said brake arms 34 in such frictional contact with the brake wheel 24 as to sustain the load upon the jack and prevents the jack from lowering under the weight of said load.

Between the extensions 35 of brake arms 34 is positioned a flat sided projection 40 formed upon the actuating lever 41 on the outer side of cover plate 10.

Figure 5:
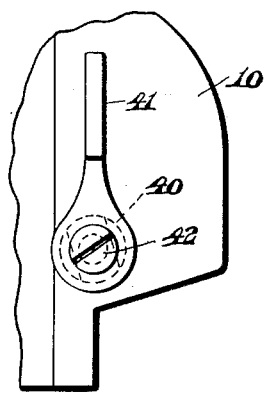
Fig. 5 represents an elevation of the cam-actuating lever for separating the brake arms from the brake wheel.
Figure 6:
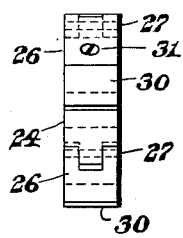
Fig. 6 represents an edge view of the brake wheel.

A portion of the flat sided projection 40 is cylindrical (as indicated in dotted lines in Fig. 5) and is positioned in a cylindrical hole in the removable plate 10, said projection 40 and actuating lever 41 being prevented from being displaced by the headed screw 42.

The springs 37 normally retain the brake arms 34 in contact with the periphery of the wheel 24 and prevent its rotation until the actuating lever 41 is moved to cause said flat sided projection 40 to separate said brake arms 34 and remove them from contact with the wheel 24.

Each brake arm 34 has secured to its inner face a curved spring plate 43 the free end of which is adapted to slide in a depression in the under face of the other brake arm 34 thereby providing a continuous surface for the shoes 30 to coact with, whatever position said brake arms 34 may be adjusted to.

It is self-evident that the pitch of the worm 19 must be such that rotary movement may be imparted thereto by the rotation of the worm gear 18 which rotary movement is in turn imparted to the brake wheel 24.

Figure 4:
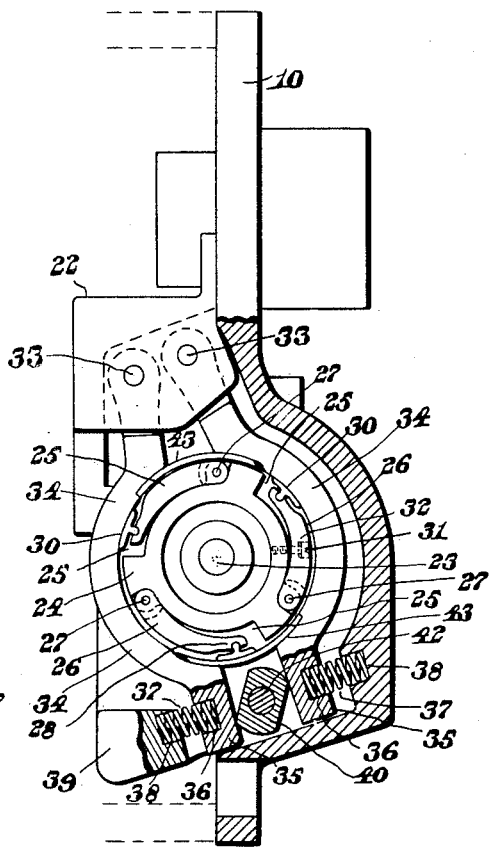
Fig. 4 represents a similar view with the brake arms in position to permit the lowering of the jack under its load, and showing the speed retarding members in frictional contact with said brake arms.

When the cam projection 40 is turned into the position shown in Fig. 4, the brake arms 34 will be separated from the brake wheel 24 and the jack is then free to lower under its load.

As the brake wheel 24 rotates, the shoes 30 successively come into frictional contact with the brake arms 34 and retard the rotation of said wheel 24 and the speed of rotation may be varied by moving the brake arms 34 at different distances from said wheel 24.

It is obvious therefore that any speed may be obtained by the manipulation of the actuating lever 41.

When the members 26 move outwardly about their pivots, the shoes 30 will conform to the curvature of the inner faces of the arms 34.

While these shoes 30 are preferably used in order to increase the frictional contact with the arms 34 they may be dispensed with if desired for it has been found in practice that very satisfactory results may be obtained by permitting the free ends of the members 26 to frictionally contact with the arms 34.

If it is desired to lower the jack by hand, the cam member 40 is turned until it is perpendicular to the extensions 35 and then the shoes 30 will not contact with the arms 34 as the outward movement of the members 26 is limited sufficiently by the members 31 to prevent such contact.

If it is desired to entirely stop the lowering of the load pressure is removed from the actuating lever 41 and the brake arms 34 will be forced into contact with the wheel 24 and prevent further rotation of the said brake wheel.

It is believed that the operation and many advantages of the invention will be understood readily without further description.

Having thus described my invention, I claim—

1. The combination of a revoluble brake wheel; brake arms normally coacting therewith; means for separating said arms from said wheel; and speed-retarding members carried by said wheel and movable outwardly into contact with said arms when removed from the wheel.

2. The combination of a revoluble brake wheel; brake arms normally coacting therewith; means for separating said arms from said wheel; and speed-retarding members pivoted to said wheel and movable outwardly into contact with said arms when removed from the wheel.

3. The combination of a revoluble brake wheel; brake arms normally coacting therewith; means for separating said arms from said wheel; speed-retarding members pivoted to said wheel; and shoes pivoted to the free ends of said members and movable outwardly into contact with said arms when removed from the wheel.

4. The combination of a revoluble brake wheel having peripheral depressions therein; brake arms normally coacting therewith; means for separating said arms from said wheel; and speed-retarding members mounted in said depressions with their outer faces normally conforming to periphery of said wheel and adapted to move outwardly into contact with said brake arms when removed from the wheel.

5. The combination of a revoluble brake wheel having peripheral depressions therein; brake arms normally coacting therewith; means for separating said arms from said wheel; and speed-retarding members pivotally mounted in said depressions with their outer faces normally conforming to periphery of said wheel and adapted to move outwardly into contact with said brake arms when removed from the wheel.

6. The combination of a revoluble brake wheel; brake arms normally coacting therewith; means for separating said arms from said wheel; spring plates secured at one end to one of said arms with their free ends positioned in depressions in the other brake arms and movable relatively thereto; and friction members carried by said wheel and movable outwardly therefrom into contact with said brake arms when removed from said wheel.

7. The combination of a revoluble brake wheel; brake arms normally coacting therewith; means for separating said arms from said wheel; spring plates secured at one end to one of said arms with their free ends positioned in depressions in the other brake arms and movable relatively thereto; and friction members pivoted to said wheel and movable outwardly therefrom into contact with said brake arms when removed from said wheel.

8. The combination of a revoluble brake wheel; brake arms mormally coacting therewith; means for separating said arms from said wheel; and means carried by said wheel and adapted to create light friction on said arms when removed from said wheel.

Signed by me at 746-7 Old South Bldg., Boston, Mass., this 17th day of July, 1920.

FRANK L. GORMLEY.

Witnesses:
 WALTER E. LOMBARD,
 NATHAN C. LOMBARD.